March 12, 1929.
P. HARDIES ET AL
1,705,013
DIRIGIBLE HEADLIGHT
Filed Nov. 7, 1927
2 Sheets-Sheet 1
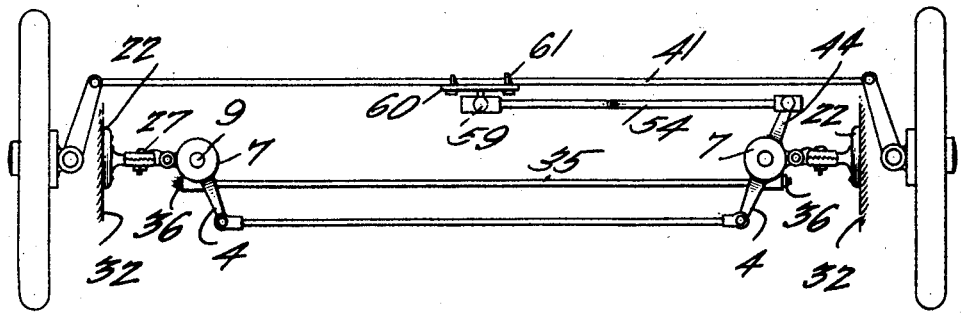
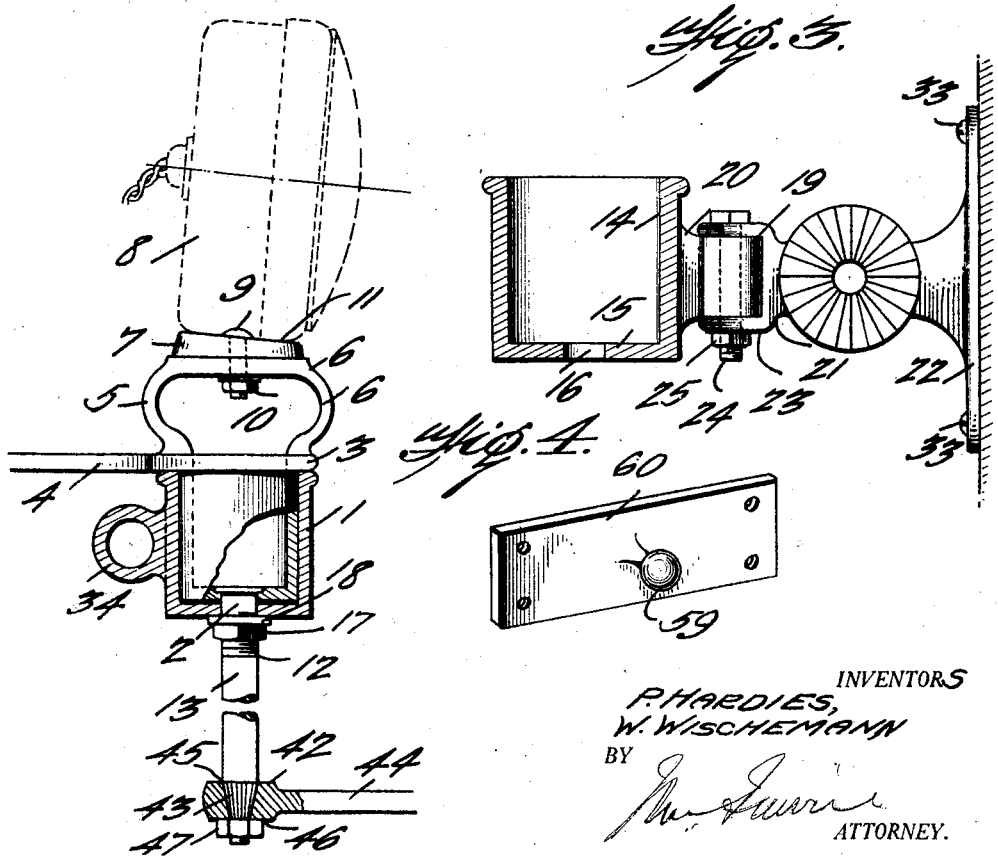
INVENTORS
P. HARDIES,
W. WISCHEMANN
BY
ATTORNEY.

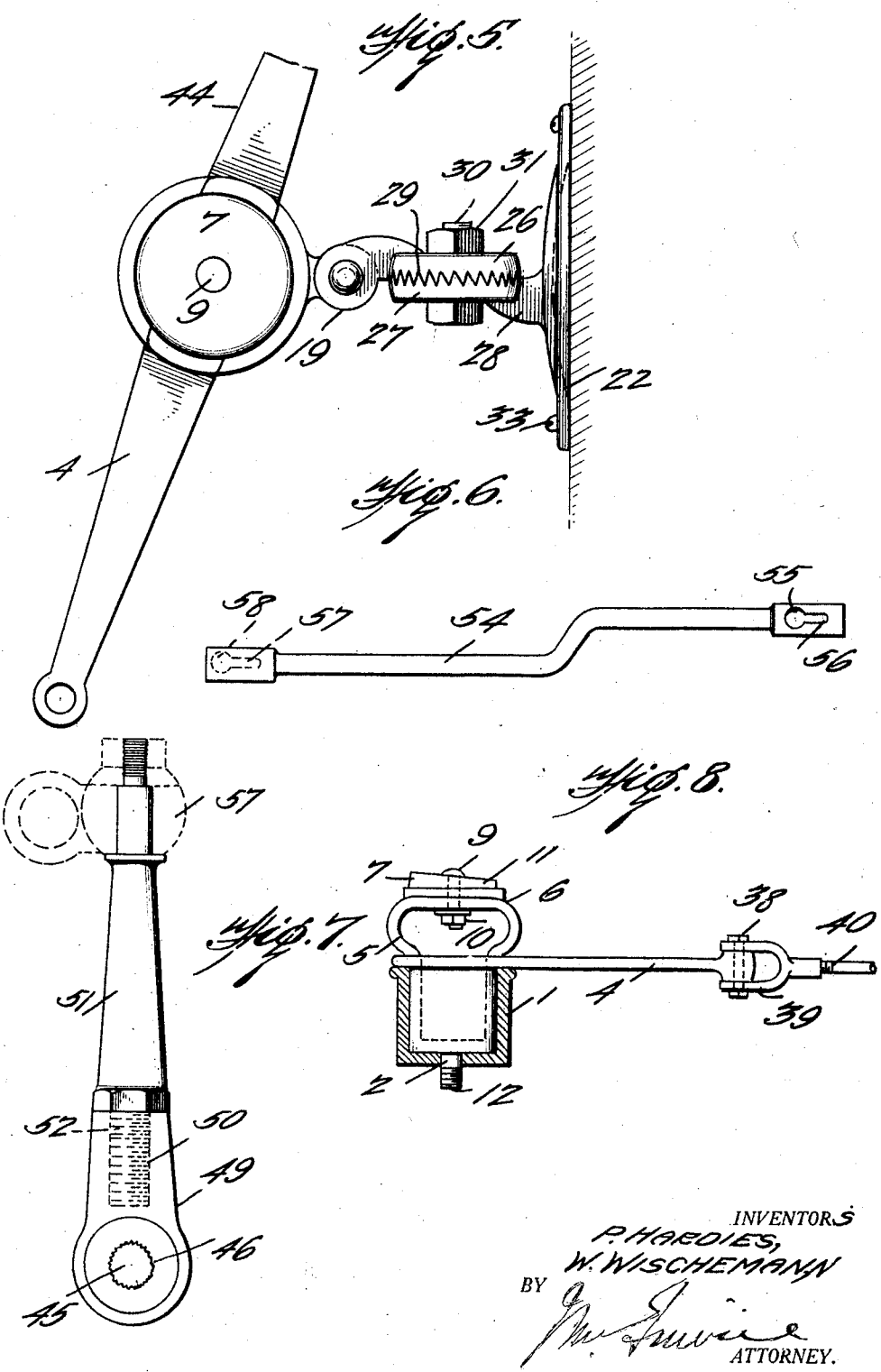

Patented Mar. 12, 1929.

1,705,013

UNITED STATES PATENT OFFICE.

PAUL HARDIES AND WILLIAM WISCHEMANN, OF PUYALLUP, WASHINGTON.

DIRIGIBLE HEADLIGHT.

Application filed November 7, 1927. Serial No. 231,735.

This invention relates to an improvement in dirigible headlights of the type which operate automatically during the steering operation of the vehicle to cause the light to follow the steering movement of the wheels and thereby cause the road toward which the vehicle is turning to be illuminated.

Dirigible headlights are well known in the art and most of such function satisfactorily for a short period after installation. Most if not all of such, however, are designed with very little regard to the conditions met with in the continued use of the headlights, with the result that such previously constructed headlights of this type have met with little favor.

From the designing point of such constructions there are certain important characteristics which must or should be present to render the headlights not only completely effective but readily adaptable to any make of car. Headlights of this character should be operable with certainty at each turning movement of the vehicle and so easily operated that the burden of such operation adds little if any resistance to the operation of the vehicle steering mechanism.

The characteristic of ease of operation and adaptation to various makes of cars has generally resulted in a construction which involves so many parts and so many interconnecting joints that the resultant structure becomes very loose after a short period of use and there is a constant rattling in the parts to say nothing of lost motion tending to an imperfect operation of the lights.

The present invention is designed primarily to provide dirigible headlights as a unitary structure, permitting them to be readily and conveniently connected to any make of car; and, further, to so construct the parts as to permit ease of operation and as to insure that the parts, when connected and tightened, will remain so throughout a long period of use, to thereby maintain the headlights substantially as rigid in the car structure as the fixed headlights while permitting their complete response to the steering movement of the vehicle.

The invention is illustrated in the accompanying drawings, in which:

Figure 1 is a plan view illustrating the application of the improvement to the forward portion of a vehicle, certain unnecessary parts of the vehicle being omitted.

Figure 2 is a view in elevation, partly broken out, showing the mounting for one of the headlights, with the headlight in position thereon.

Figure 3 is a view in vertical section, partly in elevation, showing a support for the headlight mounting and the means by which it is rigidly secured to the fender of the vehicle.

Figure 4 is a perspective view of the clip by which the dirigible headlight mechanism is connected to the tie rod of the vehicle steering mechanism.

Figure 5 is a plan view of the mounting of one of the headlights, the headlight proper being omitted.

Figure 6 is an elevation of the connector between the dirigible headlight mechanism and the steering tie rod.

Figure 7 is a plan view of the arm between the headlight mounting and the connector.

Figure 8 is a view in elevation, partly in section, of a headlight mounting to which movement is communicated by the direct operation of the other headlight mounting.

The improved dirigible headlight construction involving the subject-matter of the present invention consists in a headlight mounting to which the headlight is removably and adjustably connected; a mounting support which is designed for rigid connection with the vehicle to rotatively support the headlight mounting and which support is adjustable to provide for its proper connection with various types of vehicles; and connecting mechanism whereby the headlight mounting is connected with and adapted to be operated in the steering movement of the usual tie rod of the steering mechanism.

The mounting for the headlight, shown more particularly in Figures 2 and 7, comprises a cylindrical hollow stem 1 with a fixed depending rod-like section 2, the upper end of the stem being formed with a plate 3 from which extends an arm 4. Rising from the plate 3 is a bow member including diametrically opposed curved sections 5 carrying at their upper ends a base plate 6.

An adjusting washer 7 is rotatably supported on the base plate, and the headlight 8 of any approved form is mounted on the adjusting washer. The headlight is connected to the base plate 6 by a bolt 9 having a nut 10 below the base plate, the bolt passing through the washer 7. The washer has its upper surface 11, that is the surface on which the headlight rests, inclined with respect to the horizontal, so that the inclination of the headlight and thereby the downward projection of the light rays may be readily adjusted through the obvious positioning of the washer 7.

The headlight mountings for the respective lights, so far as the above description extends, are identical, these mountings differing, however, in the fact that the rod-like section 2 of one of the headlights, as for example that illustrated in Figure 8, is of comparatively short length and terminally threaded at 12 while the other of such headlight mountings, as the section 2, extend below the threaded portion 12, as at 13, in order to provide for the connection thereto of the operating mechanism to be later described.

The headlight mountings are each adapted for cooperation with a support in which the mountings are adapted for rotative movement and which will rigidly hold the mountings against other than such movement. These supports, identical in construction and one for each headlight mounting, are illustrated more particularly in Figures 3 and 5, and each comprises a cylindrical socket member 14 having an interior dimension to receive the stem 1 of the headlight mounting. The exterior surface of the stem and the interior surface of the socket are carefully machined so that when the parts are connected they are substantially rigid except for the necessary relative rotative movement of the stem.

The bottom 15 of each socket is formed with an opening to permit the passage therethrough of the rod-like extension 2, the threaded portion 12 of each rod-like extension being adapted to receive a nut 17 which, through the medium of an interposed washer 18, serves to hold the stem and socket against the possibility of play other than in the relative rotative movement of the stem. Each socket 14 is formed with an offset parallel vertically arranged sleeve 19 connected to the socket by a web 20, and this socket provides a swivel mounting for one member 21 of an adjustable connection between the socket and a bearing plate 22 to be connected to the fender of the vehicle.

The member 21 is terminally formed as a yoke 23 to overlie and underlie the ends of the sleeve 19, a bolt 24 passing through the arms of the yoke and sleeve and being provided with a clamping nut 25 to maintain the yoke and sleeve in rigid relation when desired. The opposite end of the member 21 of the adjustable connection terminates in a disk 26 cooperating with a similar disk 27 formed on the terminal of a web 28 projecting from the bearing plate 22.

The meeting faces of the disks 26 and 27 are deeply serrated, as at 29, and a bolt 30 provided with a clamping nut 31 passes through the disks. The disks have an axial plane at right angles to the axial plane of the yoke 23, so that the socket 14 and bearing plate 22 may be relatively adjusted to substantially any angle or position and after tightening of the nuts 25 and 31, such adjusted position will be maintained.

The bearing plate 22 is of comparatively large diameter and is adapted to seat squarely against the fender 32 of the vehicle, bolts 33 securing the bearing plate to the fender. The adjustable connection between the socket 14 and bearing plate 22 will obviously permit the bearing plate to be arranged in any position to squarely and properly cooperate with the fender of the particular vehicle while at the same time maintaining the socket 14 in an absolutely vertical and correct position to receive the headlight mounting.

Each socket is formed on its relatively rear side, that is at a ninety degree position from the sleeve 19, with a sleeve 34 and these sleeves 34 are connected by a rod 35 which extends through the sleeves and is terminally threaded to receive nuts 36. The rod 35 acts as a brace between the respective sockets and, together with the connection between the bearing plates and the sockets, serves to maintain the support in a rigid fixed relation to the fenders of the vehicle against any possibility of play which would eventually result in a looseness tending to an objectionable rattling.

It is to be particularly noted that the adjustable connection between the sockets and bearing plates and also the connection of the brace rod 35 between the respective sockets permit, through the use of the threaded terminals and nuts provided, of a tightening from time to time if such should be necessary to avoid any possibility of play. Preferably, the brace rod 35 is threaded for a length exceeding the length of the sleeve 34 and nuts 37 are arranged on the rod at the end of the sleeve opposite the bearing of nuts 36. This provides a serviceable adjustment which will insure complete rigidity of the brace rod with respect to the sockets and the immovability of the latter when the parts have been properly tightened.

The arms 4 forming part of the headlight mountings extend rearwardly relative to the headlights and are pivotally connected by bolts 38 to the yoke ends 39 of a rod 40. The terminals of the rod 40 have threaded cennection with the yokes 39 to insure that the respective headlights may be initially set in proper relative positions, it being obvious that the rod 40 serves to induce simultaneous and similar movement of the arms 4 and thereby of the headlights proper.

The extension 13 of the rod 2 of one of the headlight mountings depends to a position slightly above the tie rod 41 of the automobile steering mechanism, such extension 13 passing through an opening in the adjacent fender if the slope of the fender is such as to intercept the rod. The lower end of the extension 13 is slightly conical, as at 42, and exteriorly ribbed or serrated at 43. A turning bar 44 is connected to the lower terminal of the extension 13, said bar being formed with an opening 45 interiorly threaded at 46 to fixedly engage a cooperating portion of the extension 13, a nut 47 threaded on the lower end of the extension serving to hold the turning bar 44 in fixed rigid relation to and projected at substantially right angles from the extension 13. The turning bar 44 is formed as a head section 49 formed at one end to cooperate with the section 13 and at the opposite end with a longitudinally ranging threaded bore 50, the remaining section of the turning bar being in the form of an elongated member 51 having a stem 52 to cooperate with the threaded bore 50. This provides for lengthening or shortening the turning bar in an obvious manner to vary the extent of sweep of the headlights in the turning of the vehicle.

The free end of the section 51 of the turning bar is formed to engage a connector 53 of rod-like form in offset sections. One terminal of the connector has a head 55 formed with an appropriate socket 56 to removably receive a ball end 57 on the end of the section 51 of the turning bar, the opposite end of the connector 54 having a similar head 57 formed at 58 to receive a ball-ended projection 59 extending from a plate 60 designed to be connected by U-clamps 61 with the tie rod 41 of the vehicle steering mechanism. Obviously, the connections between the turning bar and connector and between the connector and plate 60 may be of other conventional form, though it is preferred that the ball and socket connection usually employed in parts of this character be utilized.

With the parts arranged as described, it is obvious that any movement of the tie rod 41 of the vehicle steering mechanism will correspondingly operate the connector and through the turning bar 44 turn the extension 13 of the rod section 2 of a particular lamp mounting. The movement of this particular lamp mounting will, through the rod 40, correspondingly and similarly turn the other lamp mounting. The turning of the lamp mountings will necessarily follow the turning movement of the vehicle wheels and in the same direction. Through adjustment of the section 51 of the turning bar with respect to the section 49 thereof, the extent of turning movement of the lamp mountings as compared with the turning movement of the vehicle wheels may be varied within reasonable limits.

The important characteristic of the invention is the arrangement of parts whereby the support for the lamp mountings is capable of adjustment to accommodate itself to any make of vehicle and at the same time, when in position, is so rigidly secured as to avoid any possibility of looseness, coupled with the fact that the lamp mounting cooperates with the support in such a manner and has bearing therein throughout such an extended area that any liability of looseness is largely prevented. Thus, the construction, while serving the purpose of the usual dirigible headlight, is nevertheless so arranged and the parts so related that while under perfect freedom of movement with little added resistance to the usual vehicle steering movement, they are nevertheless held so as to prevent any liability of play tending to looseness. All strains to which the parts are submitted are directly resisted by means which are designed to be taken up at will to counteract and provide for any wear incident to use. Thus, the mechanism as an entirety may be maintained in a more or less compact and relatively rigid relation, to thereby prevent any tendency of that looseness and rattling so prevalent in the ordinary types of dirigible headlights.

What we claim to be new is:

1. A dirigible headlight mechanism including a support in the form of a socket, a bearing plate to engage the fender of the vehicle, a connection between the socket and bearing plate, and a lamp mounting secured in the socket against other than rotative movement, said mounting including a stem fitting snugly within the socket for rotation therein, a base plate carried by the stem, and a rotatably mounted beveled washer movable on the base plate and forming the direct support for the lamp.

2. A dirigible headlight mechanism including supports comprising cylindrical sockets, bearing plates to be secured to the respective fenders, means between the bearing plates and sockets to permit relatively universal adjustment of the bearing plate with respect to the socket, a brace rod adjustable with respect to and forming a bracing connection between the respective sockets, a lamp mounting for each socket including a stem fitting snugly within the socket and having a rod extension depending below the socket, an adjustable lamp support carried by the stem, an arm projecting from each stem, a rod connecting said respective arms, and means intermediate one of the rod extensions of the lamp mounting and the tie rod of the wheel steering mechanism of the vehicle to turn the lamp mountings in the steering of the vehicle.

3. A dirigible headlight including supports to be rigidly secured to the respective fenders of the vehicle, each of the supports comprising a socket, a bearing plate to engage the fender, and a universal connection between the bearing plate and socket, each of said sockets being formed with sleeves arranged at right angles to the socket, and a brace rod adjustably connected in the respective sleeves to brace the sockets relative to each other.

In testimony whereof we affix our signatures.

PAUL HARDIES. [L. S.]
WILLIAM WISCHEMANN. [L. S.]